United States Patent [19]
Wood et al.

[11] Patent Number: 5,625,817
[45] Date of Patent: Apr. 29, 1997

[54] METHOD OF IDENTIFYING DB2 OBJECTS TO BE RECOVERED FROM AN UNAVAILABLE DASD VOLUME WITHOUT NEED TO ACCESS THE DASD VOLUME ITSELF AND WITHOUT NEED FOR PRE-FAILURE PREPARATION

[75] Inventors: Greg D. Wood, Cedar Park; Carla C. Birk, Austin, both of Tex.

[73] Assignee: BMC Software, Inc., Houston, Tex.

[21] Appl. No.: 395,992

[22] Filed: Feb. 28, 1995

[51] Int. Cl.$^6$ ................................................ G06F 17/30
[52] U.S. Cl. .................. 395/614; 395/611; 395/612; 395/180; 341/51
[58] Field of Search ........................... 395/600, 180, 395/575; 341/51

[56] References Cited

U.S. PATENT DOCUMENTS

| | | | |
|---|---|---|---|
| 5,384,568 | 1/1995 | Grinberg et al. | 341/51 |
| 5,396,623 | 3/1995 | McCall et al. | 395/600 |
| 5,418,940 | 5/1995 | Mohan | 395/575 |
| 5,430,871 | 7/1995 | Jamoussi et al. | 395/600 |
| 5,446,871 | 8/1995 | Shomler et al. | 395/180 |
| 5,455,946 | 10/1995 | Mohan et al. | 395/600 |

*Primary Examiner*—Thomas G. Black
*Assistant Examiner*—Cheryl Lewis
*Attorney, Agent, or Firm*—Arnold, White & Durkee

[57] ABSTRACT

A computer performing a method in accordance with the invention receives from an end-user identifier(s) for one or more damaged (or otherwise unavailable) DASD volumes, and, optionally, an identifier for one or more DB2 subsystems. By searching and correlating DB2 and MVS data resources not residing on the damaged volume(s), the computer determines which object(s) on the specified damaged volume(s) are DB2 objects, and which DB2 subsystem(s) own each of these DB2 objects. A list of recoverable DB2 objects is created, and, optionally, provided to a recovery utility program for the purpose of facilitating recovery. The method permits identification of recoverable DB2 objects without needing access to the damaged or unavailable volumes, either before or after the volume failure, thereby advantageously enabling recovery methods after a volume failure has occurred.

14 Claims, 5 Drawing Sheets

METHOD OF IDENTIFYING DB2 OBJECTS TO BE RECOVERED FROM AN UNAVAILABLE DASD VOLUME WITHOUT NEED TO ACCESS THE DASD VOLUME ITSELF AND WITHOUT NEED FOR PRE-FAILURE PREPARATION

BACKGROUND OF THE INVENTION

The invention relates to a method of determining DB2 database objects lost as a result of a direct access storage device (DASD) failing or becoming otherwise unavailable. The method advantageously permits identification of DB2 objects to be recovered after the DASD volume has become unavailable—e.g., after failure has occurred or after the DASD volume has gone off-line. Moreover, the method advantageously permits identification of DB2 objects to be recovered without requiring pre-failure preparation processing—e.g., capturing volume table of contents (VTOC) listings. Additionally, the method advantageously permits identification of DB2 objects for recovery in close to "real time," i.e., 30 seconds to 10 minutes or so following DASD becoming unavailable, in contrast to prior time-consuming techniques. The identification of DB2 objects for recovery in close to "real time" is a significant benefit because important data is kept on the DASD. When DASD volume damage occurs, it is important to determine what data exists on the volume so that it can be recovered.

The general context of the operations associated with the invention is illustrated in FIG. 1, depicting a basic computer system 10. The system administrator or other end-user generally interacts with the computer system 10 through the input-output device commonly known as an end-user terminal 15. From the end-user terminal 15, the system administrator or other end-user may provide information to or receive information from the computer system's central processing unit (CPU) 20. The CPU 20 provides the "brains" of the computer system 10, generally having the abilities to fetch and execute instructions, arithmetically manipulate data, and control and communicate with the memory and input/output components, inter alia. A computer system 10 will also generally have one or more DASD volumes 25 for the storage of data. For any number of reasons, one or more DASD volumes 25 may become damaged or otherwise unavailable, creating the need for data recovery on the damaged or unavailable volumes.

In any information systems environment, the possibility of DASD failure is everpresent. When DASD failures occur, whether such failures are software-related, e.g., corrupted data, or hardware-related, e.g., physical damage to a disk platter, the result is loss of valuable business information for potentially long periods of time. Such "downtime" can cause great hardship for the affected enterprise. Conventional recovery techniques for DB2 objects have frequently been time-consuming and, quite often, less than satisfactory in their success rates. These deficiencies often arise in part from the difficulties of identifying DB2 objects to be recovered from a DASD volume that is no longer available.

Much if not most of the prior technology entails taking a "snapshot" of the DASD contents (i.e., an image, a hard copy, or a list of the VTOCs) prior to failure, i.e., while the DASD volume is still available. By definition, such a method requires that the DASD volume be accessible so that the volume table of contents can be read, and further that the DASD volume be at least comparatively undamaged.

A problem with this prior approach arises from the fact that, as a practical matter, the volume "snapshot" will reflect the state of the DASD volume at some time prior to the DASD failure. Consequently, the "snapshot" will not reflect recent changes to the volume that may have occurred because of user actions (e.g., additions, deletions, or modifications to the data) or automated system software control (e.g., storage optimization programs). This problem is particularly acute with more modern storage management technology, because data in volumes is often physically relocated on a real-time basis (e.g., by automated storage management programs).

In addition, "snapshot" analysis volume recovery is a complicated exercise. The "snapshot" generally will contain physical dataset names. These physical dataset names are mapped to DB2 object identifiers. "Snapshot" analysis volume recovery also involves identifying the DB2 subsystem(s) to which the objects to be recovered belong, because attempting to use a first DB2 subsystem to recover a DB2 dataset belonging to a second DB2 subsystem will generally be unsuccessful.

Physical reconstruction techniques have also been used to recover data from corrupted or damaged disks. This reconstruction technique generally entails, first, physically reading the magnetic ones and zeroes from the damaged disk and then attempting to reassemble these bits into meaningful information. The physical reconstruction approach is laborious, expensive, time-consuming, and of comparatively little value in time-sensitive situations.

SUMMARY OF THE INVENTION

In a method in accordance with the invention, an end-user (such as a system administrator) specifies an identifier for one or more damaged (or otherwise unavailable) DASD volumes, and, optionally, an identifier for one or more DB2 subsystems. After the user has specified the identifier(s) for the damaged DASD volumes, it is determined which object(s) on the specified volume(s) are DB2 objects. Following identification of each of the DB2 objects on the damaged volume, a further determination is made as to which DB2 subsystem "owns" each of these DB2 objects. These determinations are made through an innovative search and correlation technique through other DB2 and MVS data resources not residing on the damaged DASD volume. By correlating specific data from these DB2 and MVS data resources, obtaining identifying data for each of the DB2 objects requiring recovery on the corrupted or damaged volume is made possible. Conventional DB2 recovery utilities generally known to persons skilled in the relevant art can then be used to effect the actual recovery of the data on the volume(s), either entirely or to a point concurrent with or subsequent to the latest reliable backup.

DETAILED DESCRIPTION OF SPECIFIC EMBODIMENTS

One implementation of the invention is described here for purposes of illustration, namely a machine-executed method of identifying DB2 objects to be recovered from an unavailable DASD volume without need to access the DASD volume itself. The machine-executed method is performed by a computer program which may be stored on a suitable program storage device (e.g., a magnetic tape, a disk, or other well-known device) and loaded into the machine's memory as needed. An actual implementation of such a program might be executable on, e.g., an IBM System 370-compatible machine or equivalent running IBM OS/VS SP2 (MVS/XA), SP3 or SP4 (MVS/ESA), or on one or more other suitable computer systems.

(It will be appreciated by those of ordinary skill, of course, that references to the performance of method steps by a computer program actually mean that a computer is performing the method steps in response to the instructions encoded in the computer program.)

In the interest of clarity, not all features of an actual implementation are described in this specification. It will, of course, be appreciated that in the development of any such actual implementation (as in any software development project), numerous programming decisions must be made to achieve the developers' specific goals and subgoals (e.g., compliance with system-related and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of MVS system program development for those of ordinary skill having the benefit of this disclosure.

Under the following embodiment of the present invention, an assumption is made that the DB2 and MVS catalogs are available and functional. If they are not available, these catalogs are preferably recovered first, e.g., manually in accordance with documented IBM-established procedures or using various commercial utilities for recovering them. (In the majority of circumstances, the chances are usually good that the DB2 and MVS catalogs are in a condition that permits ready recovery, because system administrators tend to be conservative in manipulating the DASD placement of those catalogs because of their importance.)

Figure 1:
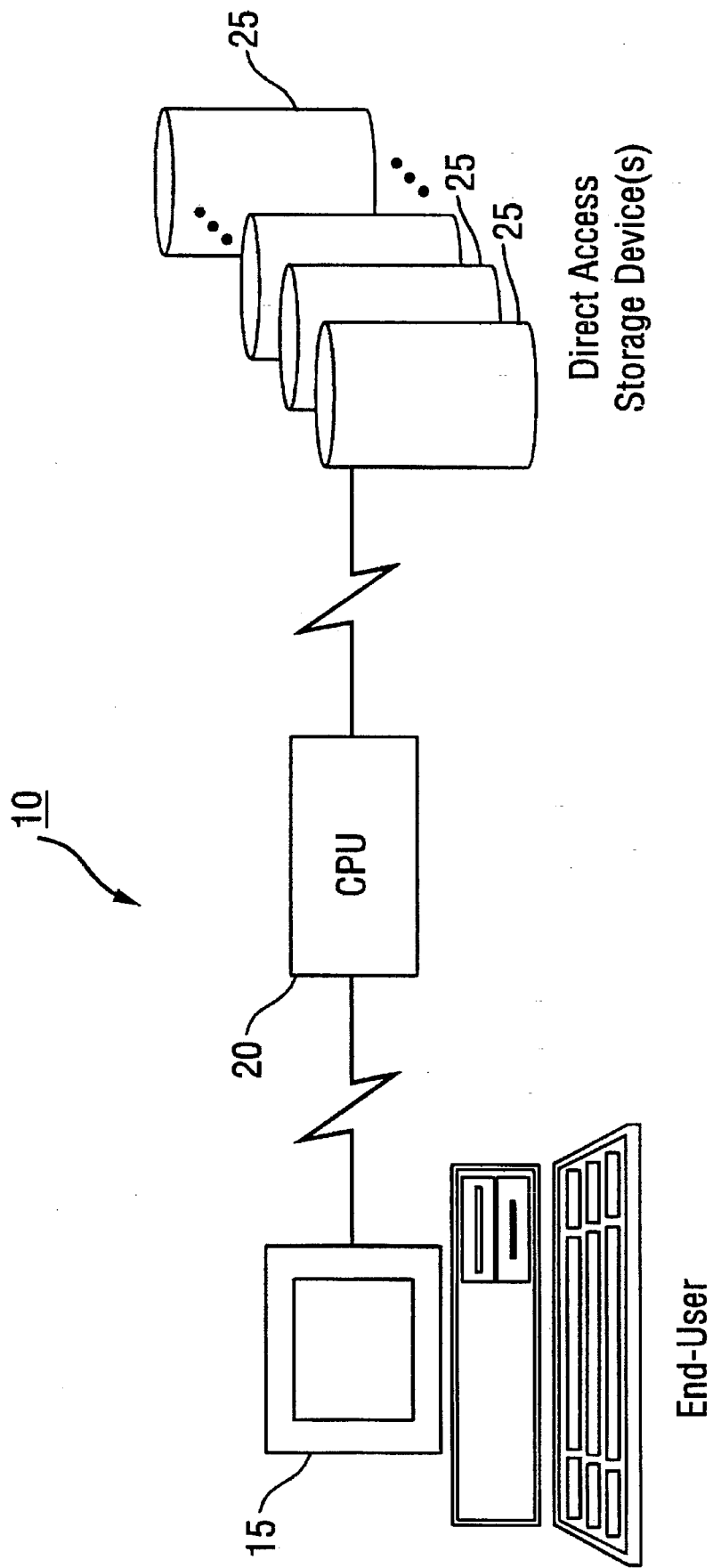
FIG. 1 is a block-diagram view of a basic computer system.
Figure 2A:
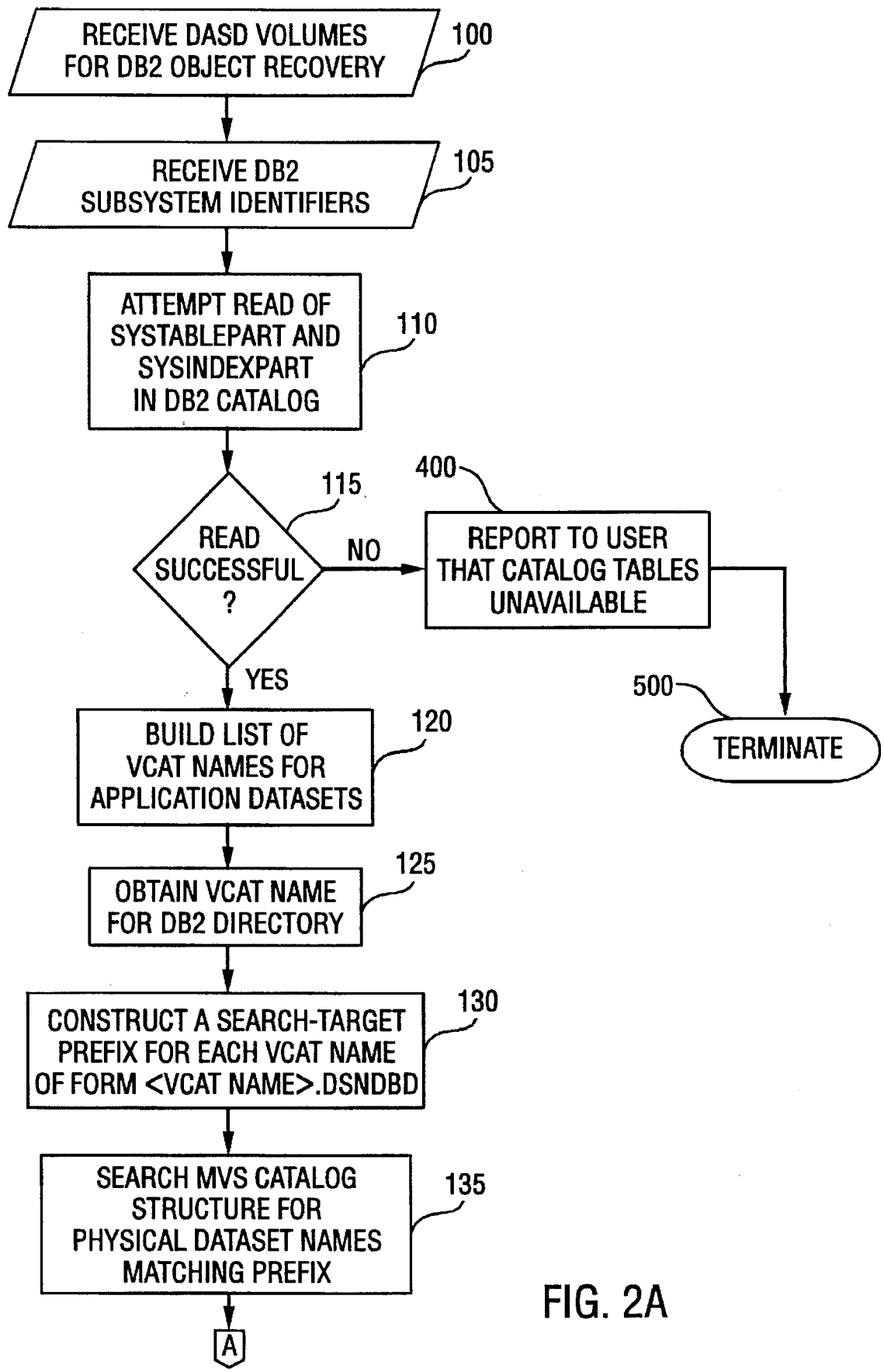
FIGS. 2A–2D are flowcharts representing a sequence of filtering steps performed in a method in accordance with the present invention.
Figure 2B:
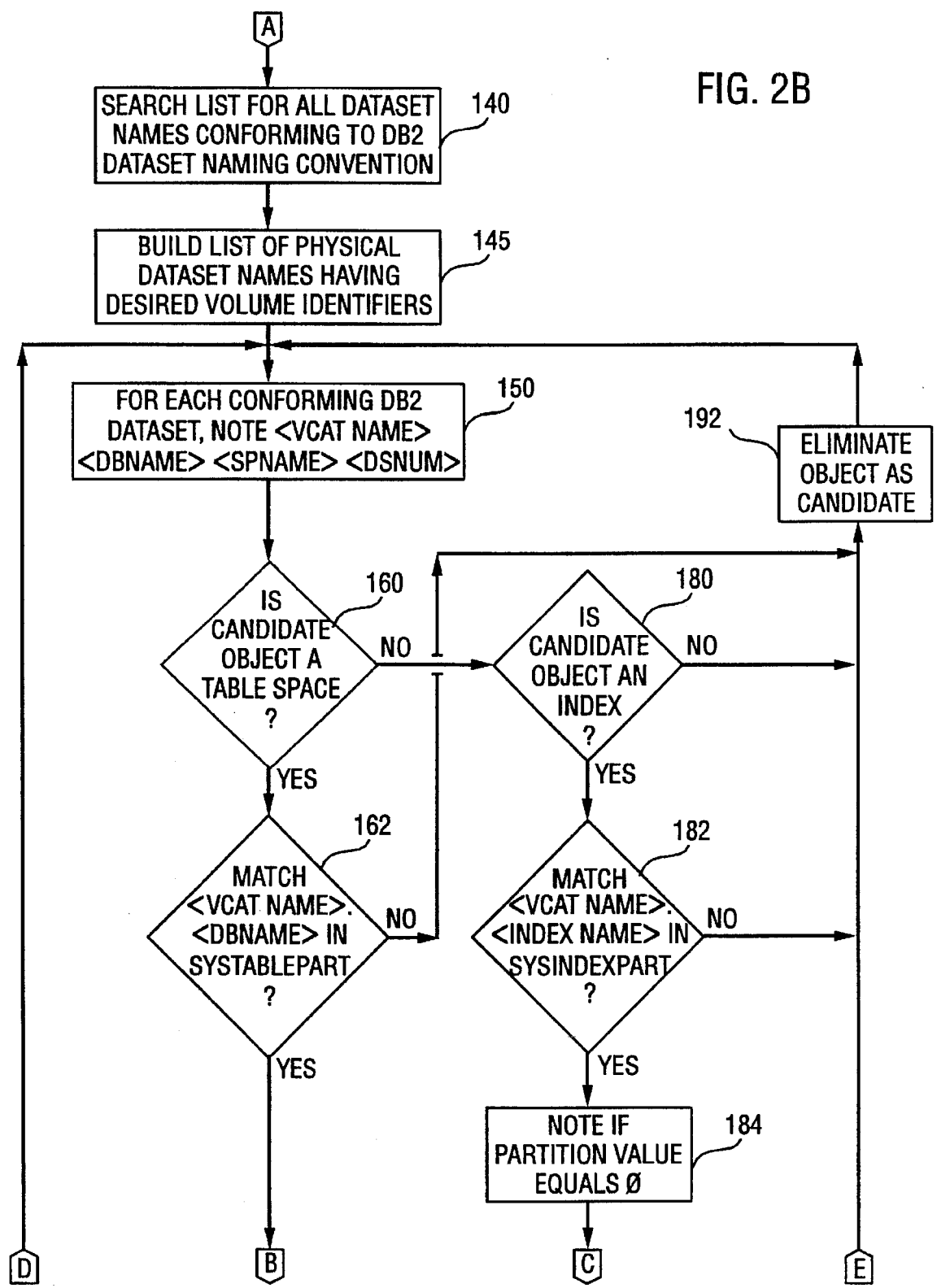
Figure 2C:
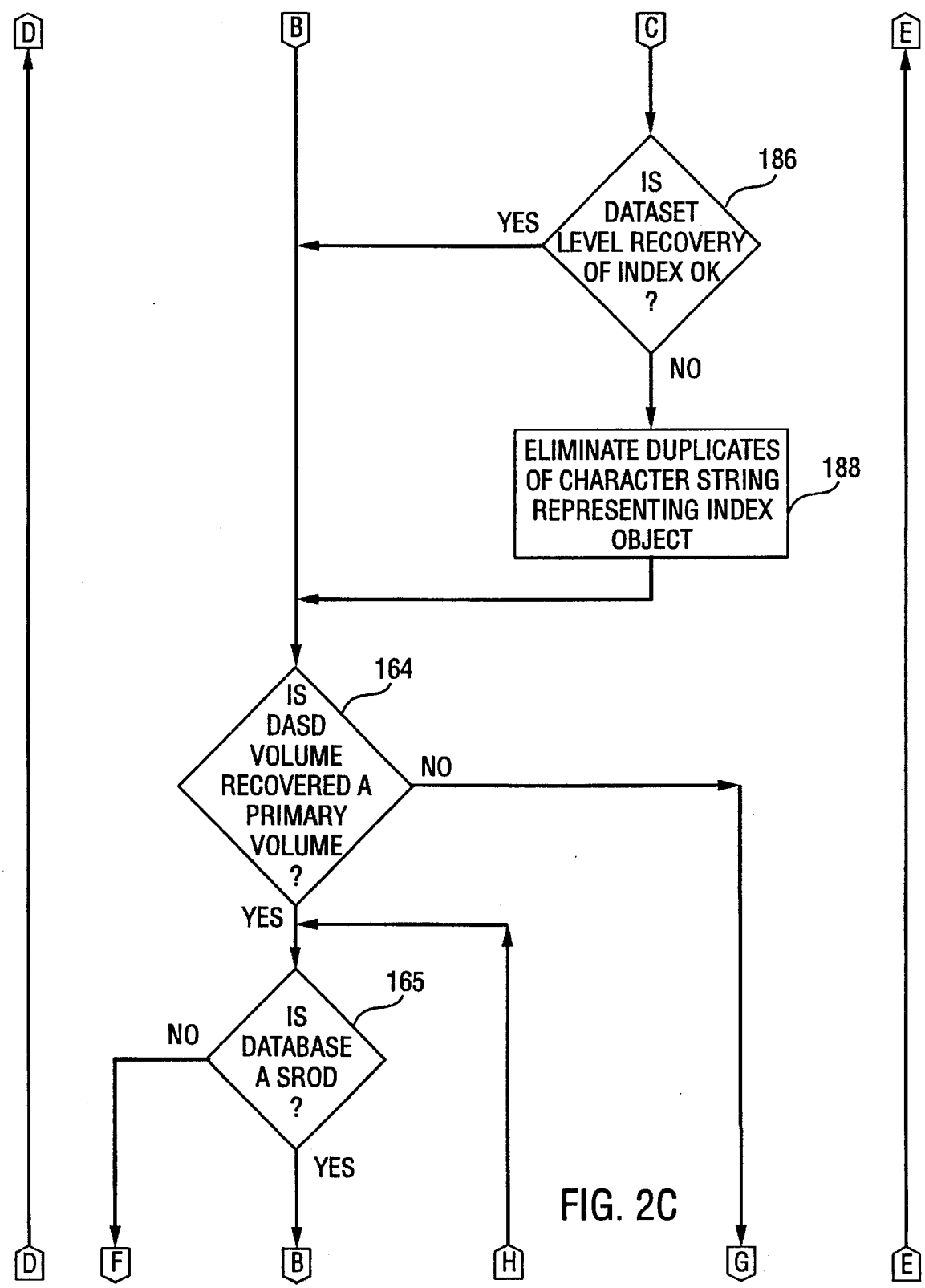
Figure 2D:
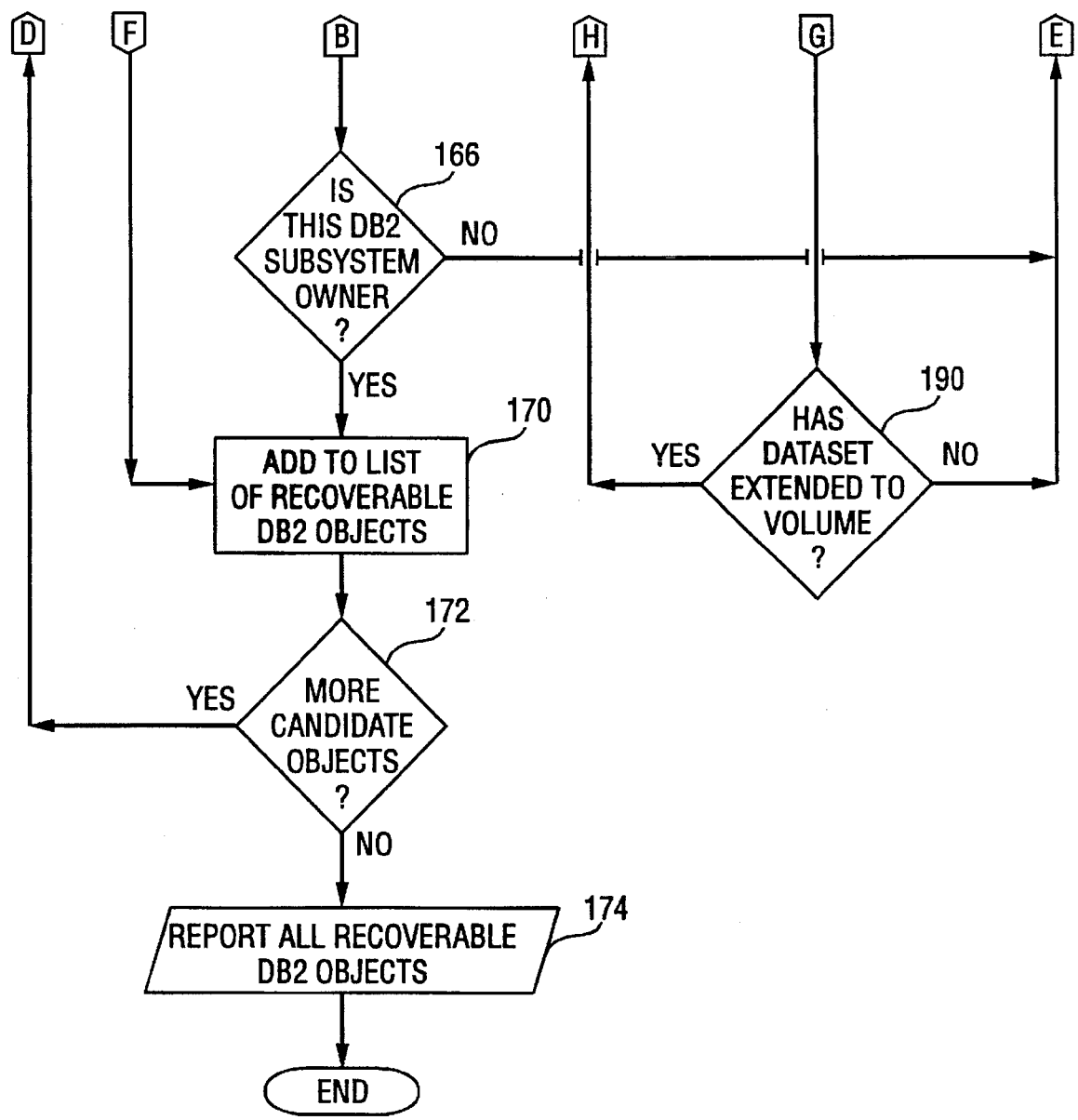

Referring to FIG. 2, the following steps represent the operation of a machine-executed method in accordance with the invention:

Step 100: Receive identifiers for one or more DASD volume(s) for which DB2 object recovery is desired, e.g., via keyboard entry, submitted batch-job file, or control cards.

(All references to "tables" in the steps that follow are intended to refer to logical representations of data physically existing as a DB2 dataset, or as a portion of a dataset.)

Step 105: Receive one or more DB2 subsystem identifiers (specifying which DB2 catalogs are to be accessed in searching for recoverable DB2 objects), e.g., via keyboard entry, submitted batch-job file, or control cards.

Step 110: Attempt to read the SYSIBM.SYSTABLEPART and SYSIBM.SYSINDEXPART tables in the DB2 catalog (presumably stored on DASD volume(s) other than the damaged volume(s)) for the specified DB2 subsystem(s).

Step 115: If the attempt to read the SYSIBM.SYSTABLEPART and SYSIBM.SYSINDEXPART tables fails, advise the user that the catalog tables are unavailable (Step 400) and terminate execution (Step 500).

Step 120: Build a list of VCAT names (i.e., VSAM catalog aliases, which are standard IBM terms) for application datasets by examining the SYSIBM.SYSTABLEPART and SYSIBM.SYSINDEXPART tables for the specified DB2 subsystem(s).

Step 125: Obtain the VCAT name for the DB2 directory by examining the active MVS ZPARMS control block (if the DB2 subsystem is up and running) or, alternatively, by looking to a user-supplied name (e.g., via keyboard entry, submitted batch-job file, program-specified dataset, or control cards) containing that information. The former approach is generally preferred because of greater reliability.

Step 130: For each VCAT name, construct a search-target prefix of the form <VCAT name>.DSNDBD. The construction of this search-target prefix permits the subsequent searching of the MVS catalog to be narrowed, thereby speeding the process. (As a general proposition, searching the MVS catalog structure without such a prefix is prohibitively time-consuming. Moreover, in the absence of a search-target prefix, the user would be required to specify MVS catalog names.)

Step 135: Search the MVS catalog structure for all physical dataset names matching the prefix pattern. One method of accomplishing such a search is to invoke the IBM IDCAMS utility, although any convenient search technique may be used. The IDCAMS search returns the full dataset name and the volume identifiers for each such dataset catalogued in the structure.

Step 140: Search, i.e., filter, the list of physical dataset names to identify all dataset names conforming to the DB2 dataset naming convention (referred to as "fully-qualified dataset names"):

<VCAT name>.DSNDBD.<dbname>.<spname>.I0001.A<dsnum> where dbname is a DB2 database name; spname is the name of a DB2 space; I0001 is a literal character string; A is the literal character "A"; and dsnum is a sequence of three digits, normally ranging from 001–064. Any DB2 dataset will have a physical dataset name conforming to this naming convention, and, thus, all conforming datasets represent candidate objects for recovery.

Step 145: Build a list including all physical dataset names that have a volume identifier matching the volume identifier(s) specified in Step 100. For example, the construction of this list may be accomplished by filtering the information returned from the search of the MVS catalog structure above.

Step 150: For each conforming DB2 dataset, note the following attributes which will be used in further searching of the DB2 catalog(s):

<VCAT name><dbname><spname><dsnum>

For each combination <VCAT name><dbname><spname>, the catalog structure of each DB2 subsystem is searched to identify a match. Normally any given combination of <VCAT name><dbname><spname> will appear in only one such catalog structure with an indicator that the corresponding DB2 subsystem is the owner of the object represented by that combination. Consequently, the appearance of any given <VCAT name><dbname><spname> combination in a DB2 subsystem's catalog structure generally indicates that the candidate object represented by that combination is "owned" by that DB2 subsystem. After the "owning" DB2 subsystem for a candidate object has been determined, the candidate object is further screened to determine whether it is a table space or an index. The process described in this paragraph is accomplished by performing the following steps, optionally in the following order:

Step 160: Search the SYSIBM.SYSTABLESPACE table for a match with the <dbname> and <spname> values for the candidate object. If a match appears, the candidate object is a table space and remains a candidate for recovery; otherwise eliminate the object from consideration. (Optionally, this Step 160 could be replaced by Step 162, but is performed to achieve greater efficiency. The requisite information is indexed, providing more efficient determination than may be attained from Step 162 alone.)

Step 180: Search the SYSIBM.SYSINDEXES table for a match with the <dbname> and <spname> values for the candidate object. If a match appears, the candidate object is an index and remains a candidate for recovery; note the <creator> and <indexname> and the clustering flag of the index for future reference. Otherwise, eliminate the object from consideration.

Step 162: If the object is a table space as determined above in Step 160, then search the SYSIBM.SYSTABLEPART table for a match with the <VCAT name>, <dbname>, and <spname> values for the candidate table space. If a match is found, the table space remains a candidate for recovery; otherwise eliminate the object from consideration (Step 192).

Step 182: If the object is an index as determined above, then search the SYSIBM.SYSINDEXPART table for a match with the <VCAT name>, <creator> and <indexname> values for the candidate index. If a match is found, the index remains a candidate for recovery; note for future reference whether the partition value equals zero, i.e., whether the index is partitioned (Step 184). Otherwise eliminate the object from consideration (Step 192).

Step 186: If the object is an index as determined above, then determine if dataset-level recovery of the index is allowed by checking the partition value and the clustering flag, each determined above. If dataset-level recovery is not allowed, it follows that duplicates of the character string representing the index object may exist; these duplicates are eliminated from consideration so that only one character string per DB2 object is considered (Step 188).

Step 165: Check the SYSIBM.SYSDATABASE table to determine if the database containing the table space or index is a Shared Read Only Database (SROD). If the database is a SROD, then proceed to Step 166, else proceed to Step 170.

Step 166: Check whether this DB2 subsystem is owner of this object. If this DB2 subsystem is owner, then proceed to Step 170, else eliminate object as a candidate (Step 192).

Step 170: Build a list of the objects that have not been eliminated from consideration. This list represents recoverable DB2 objects.

Step 164: It is anticipated that, optionally, if the volume being recovered is not a primary volume (meaning that it is not the first volume in the volume list of a multi-volume dataset), then a determination can be made whether the dataset has been extended to that volume by obtaining extent information from the volume if possible (Step 190). It is expected that this may be accomplished by performing an MVS catalog search for extent information on the fully-qualified dataset name corresponding to the object in question. If the search results indicate that the dataset does not extend to the volume being recovered, then eliminate the candidate object from consideration for recovery (Step 192).

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application.

What is claimed is:

1. A machine-executed method of identifying one or more DB2 database objects stored on an unavailable DASD volume and associated with a specified DB2 subsystem, wherein information about said one or more DB2 database objects is stored in an MVS catalog structure storage and in a DB2 catalog structure storage, said method comprising:

(a) searching said MVS catalog structure storage and said DB2 catalog structure storage for one or more descriptors that conform to a DB2 naming convention for physical DB2 datasets, each said descriptor corresponding to a logical DB2 object and being referred to as a fully-qualified descriptor, thereby producing a list of said fully-qualified descriptors; and (b) successively filtering said list of fully-qualified descriptors to create, in a storage, a list of identifiers corresponding to logical DB2 objects associated with said specified DB2 subsystem, said list of identifiers being referred to as a recovery list.

2. A method in accordance with claim 1 and further comprising:

(c) executing a recovery utility program to recover each said logical DB2 object corresponding to a respective said identifier in said recovery list.

3. A method in accordance with claim 1 and further comprising:

(c) providing said recovery list to a recovery utility program to recover each said logical DB2 object corresponding to a respective said identifier in said recovery list.

4. A method in accordance with claim 1, wherein said searching of said MVS catalog structure storage is performed by obtaining a VCAT name for a DB2 directory, said DB2 directory being one of said logical DB2 objects, and by searching an active MVS ZPARMS control block for said one or more fully-qualified descriptors, and using said VCAT name to construct a search-target prefix to be used in subsequent searching of said MVS catalog structure storage.

5. A method in accordance with claim 1, wherein said searching of said MVS catalog structure storage is performed by obtaining a VCAT name for a DB2 directory, said DB2 directory being one of said logical DB2 objects, using information contained in a user-specified input, and using said VCAT name to construct a search-target prefix to be used in subsequent searching of said MVS catalog structure storage.

6. A method in accordance with claim 1, wherein said searching of said DB2 catalog structure storage is performed by searching a SYSIBM.SYSTABLEPART table and a SYSIBM.SYSINDEXPART table in said DB2 catalog structure storage.

7. A method in accordance with claim 4, wherein said searching of said MVS catalog structure storage is performed by searching said MVS catalog structure for all physical dataset names matching a search-target prefix pattern.

8. A method in accordance with claim 7, wherein said search-target prefix pattern is of the form <VCAT name>.DSNDBD.

9. A method in accordance with claim 7, wherein said searching of said MVS catalog structure storage is performed by invoking the IBM IDCAMS utility.

10. A method in accordance with claim 1, wherein said DB2 naming convention is of the form <VCAT name>.DSNDBD.<dbname>.<spname>.I0001.A<dsnum>.

11. A machine-executed method of identifying for recovery one or more DB2 database objects associated with a specified DB2 subsystem, said one or more DB2 database objects stored on an unavailable DASD volume specified for recovery, wherein information pertaining to said one or more DB2 database objects is stored and accessible in an MVS catalog structure storage and in a DB2 catalog structure storage, said method comprising:

(a) searching said MVS catalog structure storage for all physical dataset names matching a search-target prefix;

(b) building a list of all physical dataset names having a volume identifier matching the volume identifier for said unavailable DASD volume;

(c) filtering said list of all physical dataset names to include only those dataset names conforming to a standard DB2 dataset naming convention, each said physical dataset name contained in said list being referred to as a candidate object;

(d) searching said DB2 catalog structure storage to identify the DB2 subsystem owning each said candidate object;

(e) eliminating from said list of all physical dataset names each said candidate object that is not a table space and not an index;

(f) eliminating from said list of all physical dataset names each said candidate object that is determined to be a table space that does not have a corresponding match in the SYSIBM.SYSTABLEPART table;

(g) eliminating from said list of all physical dataset names each said candidate object that is determined to be an index that does not have a corresponding match in the SYSIBM.SYSINDEXPART table; and (h) eliminating from said list of all physical dataset names any duplicates of each said candidate object that is determined to be an index, the existence of said duplicates indicated by the unavailability of dataset-level recovery of said index.

12. A method in accordance with claim 11 and further comprising:

(i) eliminating from said list of all physical dataset names each said candidate object not extending to said volume for recovery.

13. A method in accordance with claim 12 and further comprising:

(j) converting said list of all physical dataset names to DB2 object identifiers, said DB2 object identifiers being of a form usable by available recovery utilities.

14. A program storage device readable by the machine of a specified one of claims 1–13 and encoding a program of instructions for performing the operations recited in said specified claim.

* * * * *